Aug. 22, 1967 G. BATE ET AL 3,337,856

NON-DESTRUCTIVE READOUT MAGNETIC MEMORY

Filed June 28, 1963

INVENTORS
GEOFFREY BATE
JOHN R. MORRISON
DENNIS E. SPELIOTIS

BY SUGHRUE, ROTHWELL, MION & ZINN
ATTORNEYS

United States Patent Office 3,337,856

Patented Aug. 22, 1967

3,337,856

NON-DESTRUCTIVE READOUT MAGNETIC MEMORY

Geoffrey Bate, Poughkeepsie, John R. Morrison, Wappingers Falls, and Dennie E. Speliotis, Poughkeepsie, N.Y., assignors to International Business Machines Corporation, New York, N.Y., a corporation of New York Filed June 28, 1963, Ser. No. 291,521
3 Claims. (Cl. 340—174)

ABSTRACT OF THE DISCLOSURE

A thin film magnetic memory capable of providing non-destructive readout. Two continuous isotropic thin films are used with the bit positions being determined by the cross-over points of a grid of wires. One film has a very high coercive field and is used as the storage film. The second film has a low coercive field and is used as the readout film. The storage film is magnetized at the bit positions by any convenient means, the direction of magnetization being an indication of the stored information. The external field of the magnetized storage film is strong enough to cause the adjacent dipoles in the readout film to be oriented anti-parallel to the dipoles of the storage film. During readout, the fields created by the readout currents switch only the dipoles in the readout film thereby providing an indication of the information in the storage film without destroying that information. After the currents are removed, the external field of the dipoles in the storage film causes the dipoles in the readout film to switch back to their anti-parallel position.

This invention relates to non-destructive readout magnetic memories, and particularly to magnetic memories of this type using thin films.

It is known in the prior art that a non-destructive readout magnetic memory can be made by the use of pairs of thin vacuum deposited films as memory cells, one film having a relatively high coercivity, the other low coercivity; the one film serving as the storage element, the second as readout element which can be interrogated without disturbing the magnetized state of the storage element.

One of the problems encountered with this type of memory is that the greater the recording density, which means the shorter the length of the recorded dipoles, the stronger is the demagnetizing field. In order to meet this condition, the art has resorted to the use of small thin discs of anisotropic materials, that is, materials which have preferred directions of magnetization, the preferred directions of the two films being relatively oriented in particular ways to achieve the desired effect.

The establishment of a preferred direction of magnetization in a predetermined direction is difficult and uncertain; the preferred direction, once having been determined can even change during use. The problem is even greater where the preferred directions of magnetization of two anisotropic materials have to be related to each other.

Furthermore, in the type of recording mentioned each small disc-pair acts as a single dipole and determines the limit of density of recording in dependence upon the smallness of the diameter of the discs which can be achieved in a practical application, and the closeness of spacing of the spots which can be used, considering the demagnetizing effect of the fringe fields on adjacent spots.

One object of this invention is to increase the possible density of recording in a magnetic memory using a storage element comprising two layers, one being for non-destructive storage and the other for readout.

Another object of the invention is to provide a magnetic memory of the kind described which does not involve the problems associated with the use of anisotropic materials.

In accordance with the principle of the invention, these objects are achieved by using for the storage member a continuous film of isotropic ferromagnetic material of very high coercivity and, associated therewith, a thin continuous film isotropic ferromagnetic material of relatively low coercivity.

More particularly, in comparison with the anisotropic material used in the prior art having a coercivity of 7–15 oersteds, for example, in accordance with our invention, the storage film is composed of isotropic ferromagnetic material having a coercivity of from 50 to 1000 or more oersteds.

The use of the continuous thin film of high coercivity ferromagnetic material for the storage film makes possible a much denser packing of recorded bits, because the high coercivity of the storage film defeats the demagnetizing influence of the fringe field of adjacent magnetized spots. The packing density is thus not limited by the magnetic memory itself, but only by the capability of the means for recording bits on the magnetic memory.

An advantage of the invention is that it is now possible to use low cost isotropic material and to avoid the problems accompanying the use of preferred directions of magnetization.

The foregoing and other objects, features and advantages of the invention will be apparent from the following more particular description of the preferred embodiment of the invention, as illustrated in the accompanying drawings.

Figure 1:
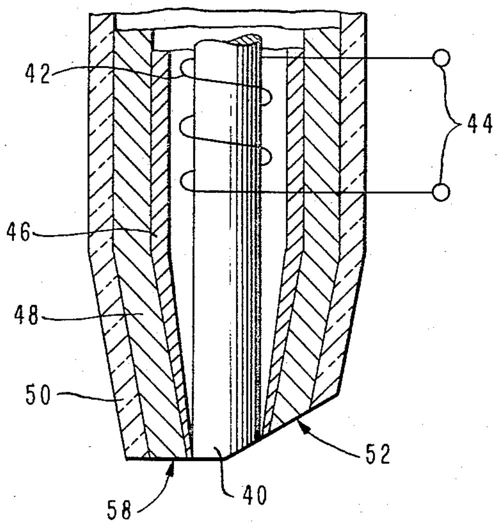
FIG. 1 is a vertical section of a magnetizing probe which may be used for recording bits on a magnetic memory sheet embodying the invention.

In the embodiment of the invention shown in the drawing for illustrative purposes a "sandwich" of thin films 10 and 12 is established on a glass substrate 14, together with certain wire grid arrangements to accomplish the readout. More particularly, on the glass substrate 14 there is laid out a series of parallel horizontal drive wires 16, which are insulated from a crossing array of vertical drive wires 18 by a silicon monoxide bonding and insulating layer, not separately shown. The vertical drive wires 18 are covered by another insulating layer of silicon monoxide, over which is deposited a soft ferromagnetic readout film 12, such as Permalloy, which is the proprietary name of an alloy consisting of 80% nickel and 20% iron. The two layers of silicon monoxide are represented by the line 20.

Over the Permalloy film 12 is another coating of silicon monoxide, upon which are laid a diagonal array of sense lines 28. These are then covered with another layer of silicon monoxide, upon which is finally deposited a storage film 10 of hard magnetic material, such as cobalt. In accordance with the invention the last mentioned film 10 has a coercive force ranging from 50 oersteds to 1000 oersteds or more. The line 30 represents the last two mentioned layers of silicon monoxide.

The preferred method of depositing each of the layers described is vacuum deposition, but other equivalent methods of deposition may be used. The layers so deposited include the two arrays of crossed drive wires 16 and 18, the soft magnetic film 12, the sense lines 28 and the hard magnetic film 10, as well as the layers of silicon monoxide used for bonding and insulation. The order of deposition of the layers described is preferred, since it leaves the hard magnetic layer exposed in position for most effective recording. The reverse order could, however, be used and the particular locations of the wires shown is not essential.

Any suitable means of magnetizing the storage film 10 may be used, which is capable of magnetizing material of such high coercivity. One such means which can produce a very high density of recording is the special magnetic probe shown in FIGURES 1 and 2. The particular structure of this magnetic probe forms no part of the present invention. The probe comprises an inner electrode 40 upon which is a winding 42 of insulated wire, the terminals 44 of which are brought out to the exterior of the probe. Deposited over the electrode 40 and winding 42 is a generally cylindrical sheath 46, of a non-magnetic material such as copper. While the sheath 50 is shown separated from the electrode 40 and winding 42 in FIGURE 1, for the sake of clarity, actually it is deposited directly upon the electrode 40 and the insulated wire of winding 42. Over the copper is deposited another ferromagnetic layer 48 and the whole multilayer structure is potted in a plastic cover 50.

Figure 2:
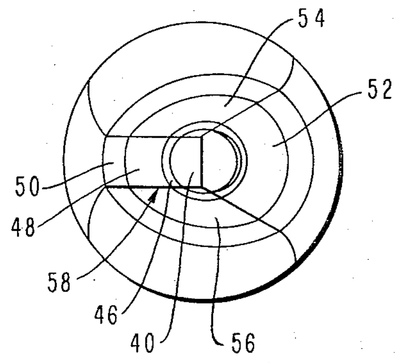
FIGURE 2 is a bottom plan view of the probe shown in FIGURE 1.
Figure 4:
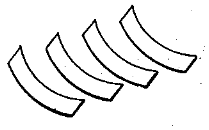
FIGURE 4 is a detail plan view of a portion of the magnetic memory sheet shown in FIGURE 3, illustrating the dense packing possible.

To complete the probe its tip is lopped off at various angles, to form a slope surface 52, two sloped surfaces 54 and 56, and a contact face 58, preferably normal to the axis of the probe. The contact face 58 is the active, magnetizing surface which is applied to the face of the memory sheet. As shown in FIGURE 2, the individual layers exposed at the contact face are: the inner probe 40, the copper sheath 46, the outer ferromagnetic tube 48, and the ceramic cover 50. The copper sheath 46 forms a gap between the two ferromagnetic electrodes 40 and 48.

Figure 3:
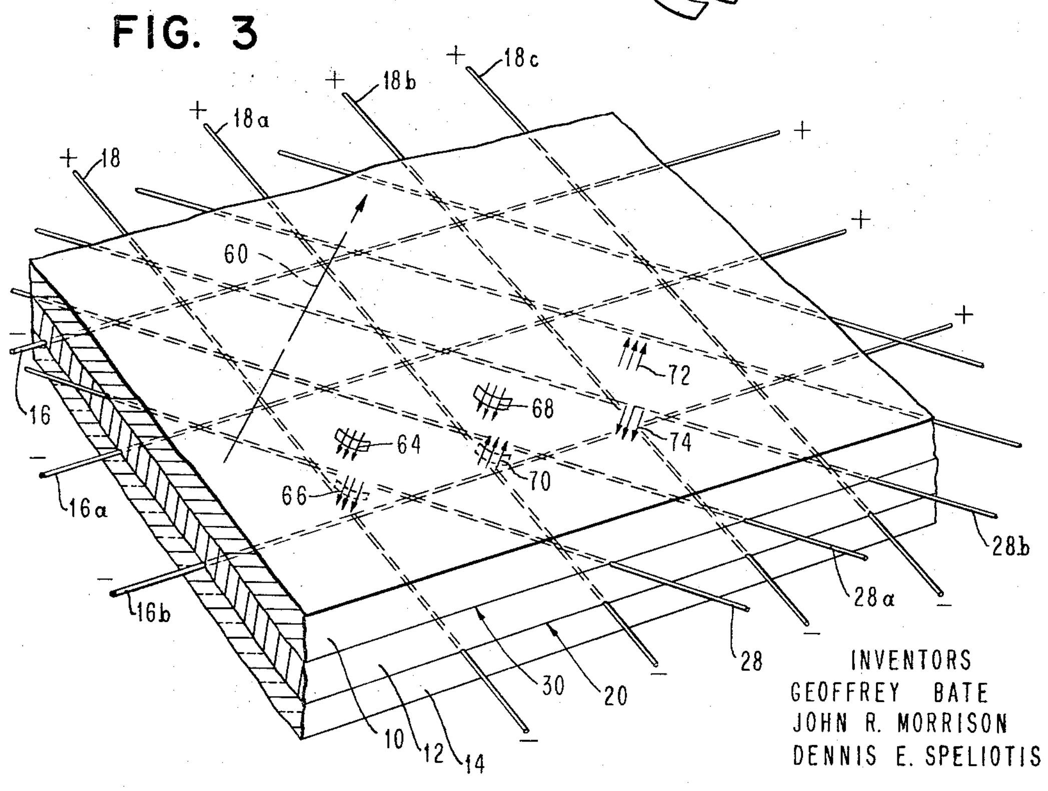
FIGURE 3 is a diagrammatic perspective view of a magnetic memory sheet embodying the invention.

Before recording begins the memory sheet is erased by any suitable means, preferably such as to leave the entire storage film uniformly magnetized in the direction indicated by the long arrow 60 in FIGURE 3. This can be done, for example, by passing the core of a strong electromagnet over the upper surface of the memory sheet, while the core is D.C. magnetized to make its end adjacent the memory sheet a south pole. The readout film will be left magnetized parallel to the plane of the film, in the opposite direction.

When the contact face 58 of the magnetic probe is laid upon an area of the storage film over one of the intersections of the horizontal and vertical drive wires and a current is passed through the probe winding 42 of sufficiently high ampere turns, the metal of both films in the area under the gap 46 of the probe will be magnetized in the same direction, as indicated in FIGURE 3 by the arrows in the upper magnetized spot 64, in the storage film 10, and the arrows in the lower magnetized spot 66, in the readout film 12. When the current is cut off the direction of magnetization in the soft magnetic layer is reversed, as the lines of force at the ends of the dipole in the hard magnetic layer return through the soft magnetic layer. This condition is indicated by the arrows in the upper and lower magnetized spots, 68 and 70, respectively. It is now possible to read out the bit 70 stored in the soft magnetic layer by any suitable means, such as that shown in the illustrative embodiment. By driving half-select currents through the horizontal wire **16*b* and vertical wire 18*a*, in the direction indicated by the + and — signs, the magnetization of the spot 70 in the readout film will be reversed. When the currents are cut off, the magnetization of this spot in the soft film will be restored by the external field of spot 68 of the hard magnetic layer. This switching of the magnetization of the soft magnetic film back to the original direction will induce a current in the sense winding 28*a***, which can be detected in any conventional manner and might be taken as indicating a one.

In a recording area such as 72 the direction of magnetization will carry over from the previous erasing operation, as indicated by the arrows, and in the related area 74 of the readout film the magnetization will be reversed. Accordingly when the spot 74 is interrogated by currents on wires **16*b* and 18*b* there will be no reversal of the magnetization at spot 74 and no counter reversed when the current stops. No current will be induced in sense wire 28*b***, which might be taken to represent a zero at this spot.

Due to the very high coercive force of the ferromagnetic film used as the storage film in this invention the external field from any spot, such as 74, magnetized in one direction will not be capable of erasing the adjacent spot 72, magnetized in the opposite direction.

While the invention has been particularly shown and described with reference to a preferred embodiment thereof, it will be understood by those skilled in the art that various changes in form and details may be made therein without departing from the spirit and scope of the invention.

What is claimed is:

1. In a non-destructive readout magnetic memory, a storage layer formed of a continuous film of isotropic ferromagnetic material having a coercivity of at least 50 oersteds, and bonded thereto a readout layer formed of a continuous film of isotropic ferromagnetic material of relatively low coercivity.

2. In a non-destructive readout magnetic memory, a storage layer formed of a continuous film of isotropic ferromagnetic material having a coercivity of at least 50 oersteds, and bonded thereto a readout layer formed of a continuous film of isotropic ferromagnetic material of relatively low coercivity, said storage layer being characterized, at selected areas thereof, by minute magnetic dipoles oriented in one direction, or the opposite directions, in dependance upon data significance, said readout layer being characterized, at each area thereof proximate to one of said selected areas of said storage layer, by a minute magnetic dipole of polarity reversed to that of the related dipole in the storage layer.

3. A read-only magnetic memory comprising:

(a) a hard isotropic magnetic layer preset to selective bit values over its area, each bit in a defined bit area;

(b) a soft isotropic magnetic layer adjacent said hard magnetic layer which reflects, in defined bit areas, the setting of corresponding bit areas of said hard magnetic layer; and (c) means to read out the settings of said soft magnetic layer bit areas without affecting said hard magnetic layer bit areas, whereby after readout said hard magnetic layer bit areas re-establish the pre-readout condition of the corresponding soft magnetic layer bit areas.

References Cited

UNITED STATES PATENTS

| | | | |
|---|---|---|---|
| 3,191,162 | 6/1965 | Davis | 340—174 |
| 3,210,742 | 10/1965 | Clow | 340—174 |

OTHER REFERENCES

IBM Technical Disclosure Bulletin, "Non-Destructive Readout Device Using Isotropic Thin Magnetic Films" by I. Tsu, October 1959, page 40; vol. No. 2.

BERNARD KONICK, *Primary Examiner.*

JAMES W. MOFFITT, *Assistant Examiner.*